C. B. CHAFFEE.
Buttons.

No. 202,789. Patented April 23, 1878.

Attest:
H. L. Perrine
John North

Chas. B. Chaffee.
Inventor:
By James L. Norris.
Atty.

UNITED STATES PATENT OFFICE.

CHARLES B. CHAFFEE, OF TOLEDO, OHIO.

IMPROVEMENT IN BUTTONS.

Specification forming part of Letters Patent No. 202,789, dated April 23, 1878; application filed January 16, 1878.

*To all whom it may concern:*

Be it known that I, CHARLES B. CHAFFEE, of the city of Toledo, in the county of Lucas, State of Ohio, have invented new and useful Improvements in Buttons, which improvements are fully set forth in the following specification, reference being had to the accompanying drawings.

The object of my invention is to readily attach and securely fix buttons, made of metals or other materials, to garments or fabrics of any kind by such a device that they can be easily removed and used again.

To this end my invention consists, first, in the combination, with a button-head having a removable centrally-inserted tubular shank, internally screw-threaded and split at its inner end, of a conical screw, adapted to be inserted in said split end, and a washer fitting outside of the shank, whereby, when the several parts are in place, the conical screw will expand the split end of the shank and prevent the washer from slipping therefrom; and, second, in a button-head having an annular flange upon its under side, in combination with a central screw-shank, and a washer held by the said shank, and provided with an annular depression in its inner surface to receive the flange of the button, whereby, when the parts are in place, the cloth or fabric to which they are attached will be firmly held between said flange and washer.

A washer, having in the center of it a tapered hole, and its inner surface concaved, fits around the end of the bolt, and rests against the edge of the flange. It is readily seen that by passing the end of the bolt which extends out through a hole or eyelet in the fabric, and placing the washer over the bolt as it protrudes through the fabric, and tightening up the tapered screw, that the two or more parts of the bolt are forced against the sides of the tapered hole in the washer, thus causing the washer to be forced against the fabric, which is held firmly between its inner surface and the edge of the flange.

Figure 1:
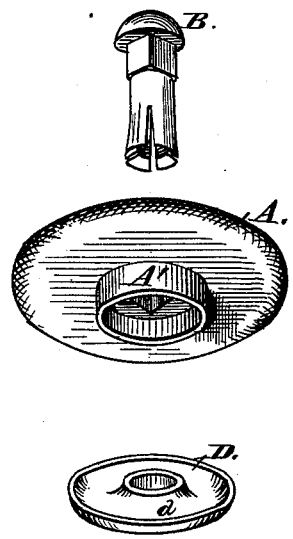
Figure 2:
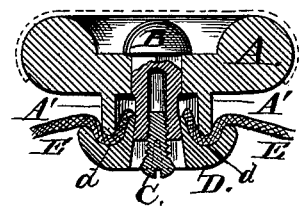
Figure 3:
Figure 4:
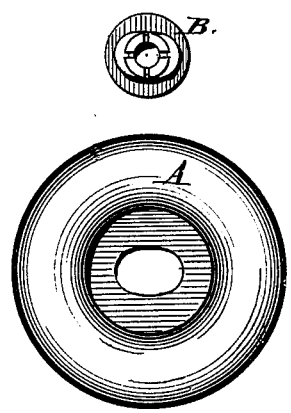

In the drawings, Figure 1 represents the several parts composing the button, each detached from the other. Fig. 2 is a vertical section of the button, the parts being in proper position. Fig. 3 is a view of the shank, with the screw inserted therein; and Fig. 4 illustrates a modification of the top and the shank.

Referring again to the drawings, the letter A designates a button-head, while A' is a flange extending from its inner surface, forming a part thereof. B represents a bolt or shank passing through the button-head A. C represents a tapered or conical screw having a tapering head. D represents a washer having an annular depression, d, in its inner surface. E represents the fabric.

As the tapered screw is driven down into the slotted end of the bolt B, the two or more parts of the bolt are expanded against the tapered surface of the hole in the washer D, thus forcing said washer against the fabric, holding it firmly on the edge of the flange of the button-head.

The bolt or shank B is removable, and may have that portion of its length which passes through the button-head square, oval, or of other suitable shape, so as to correspond with a similarly-shaped opening in said button-head.

Having thus described my invention, what I claim is—

1. In a button, the tapered screw C, in combination with the threaded and slotted bolt B, and the washer D, provided with a tapered hole, substantially as shown and described.

2. In a button, the flange A' A', in combination with the button-head A and the washer D, provided with a concave surface, all substantially as and for the purpose herein set forth.

CHARLES B. CHAFFEE.

Witnesses:
CHAS. L. RHOADES,
J. N. CLOUSE.